No. 791,163. PATENTED MAY 30, 1905.
W. R. & R. PITT.
GATE OPERATING MECHANISM.
APPLICATION FILED DEC. 30, 1904.

2 SHEETS—SHEET 1.

WITNESSES:
Gustave Dietrich
Edwin H...

INVENTORS
William R. Pitt
Rafford Pitt
BY
Frank L. Crawford
ATTORNEY

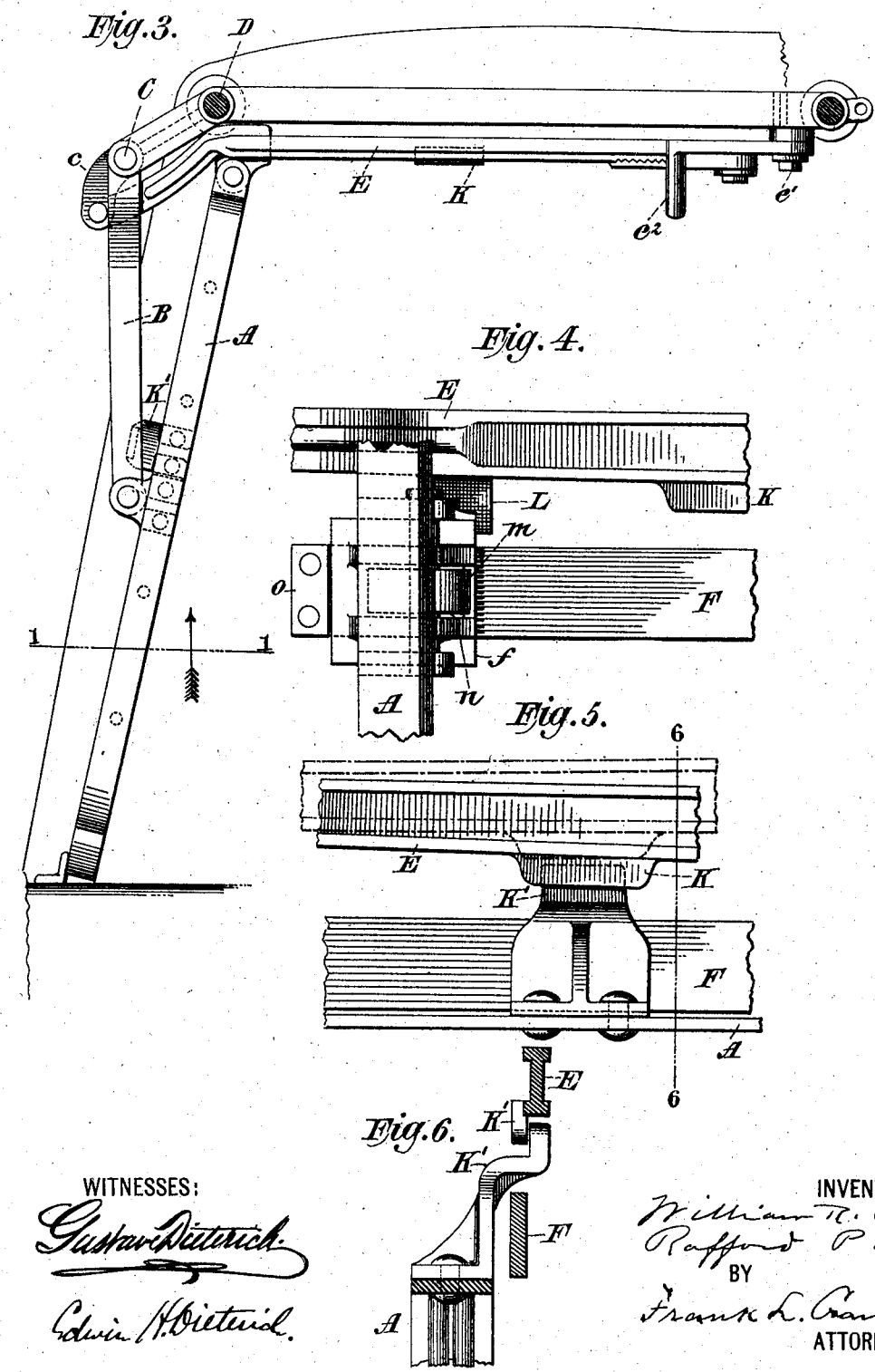

No. 791,163. Patented May 30, 1905.

UNITED STATES PATENT OFFICE.

WILLIAM R. PITT AND RAFFORD PITT, OF NEW ROCHELLE, NEW YORK, ASSIGNORS TO THE PITT CAR GATE COMPANY, A CORPORATION OF NEW JERSEY.

GATE-OPERATING MECHANISM.

SPECIFICATION forming part of Letters Patent No. 791,163, dated May 30, 1905.

Application filed December 30, 1904. Serial No. 238,893.

*To all whom it may concern:*

Be it known that we, WILLIAM R. PITT and RAFFORD PITT, citizens of the United States, and residents of New Rochelle, in the county of Westchester and State of New York, have invented certain new and useful Improvements in Gate-Operating Mechanism, of which the following is a full, clear, and exact specification.

Our invention relates to an improvement in the mechanism for opening and closing swinging gates, and more particularly the mechanism for opening and closing gates that are pivotally supported upon the free ends of swinging arms. In gates of the character referred to difficulty is usually found in maintaining the gate securely in open or closed position, as the case may be. Various locking devices have been employed, but none with entire satisfaction, since they are either so complicated as to require some special handling from the operator in order to release the gate when it is desired to reverse its position or else they do not entirely prevent motion of the gate when pressure is exerted upon it.

The object of our invention is to supply satisfactory locking devices for gates of the character referred to, which devices hold the gate firmly in place in either its open or closed position and are engaged or disengaged by the motion of the operating-lever without separate attention from the operator.

In general terms our invention comprises the combination with a gate, swinging arms forming a support for and having a pivotal connection with the gate, a spindle to which the swinging arms are secured, a crank-arm secured to said spindle, an angle-lever, and a connecting-rod between the angle-lever and the crank-arm, of locking devices consisting of shoulders projecting from said connecting-rod and adapted alternately to engage frictionally with the framework of the gate when the angle-lever is moved alternately to its extreme positions in the opening or closing of the gate.

Our invention is shown in the accompanying drawings, in which similar letters refer to similar parts.

Figure 1:
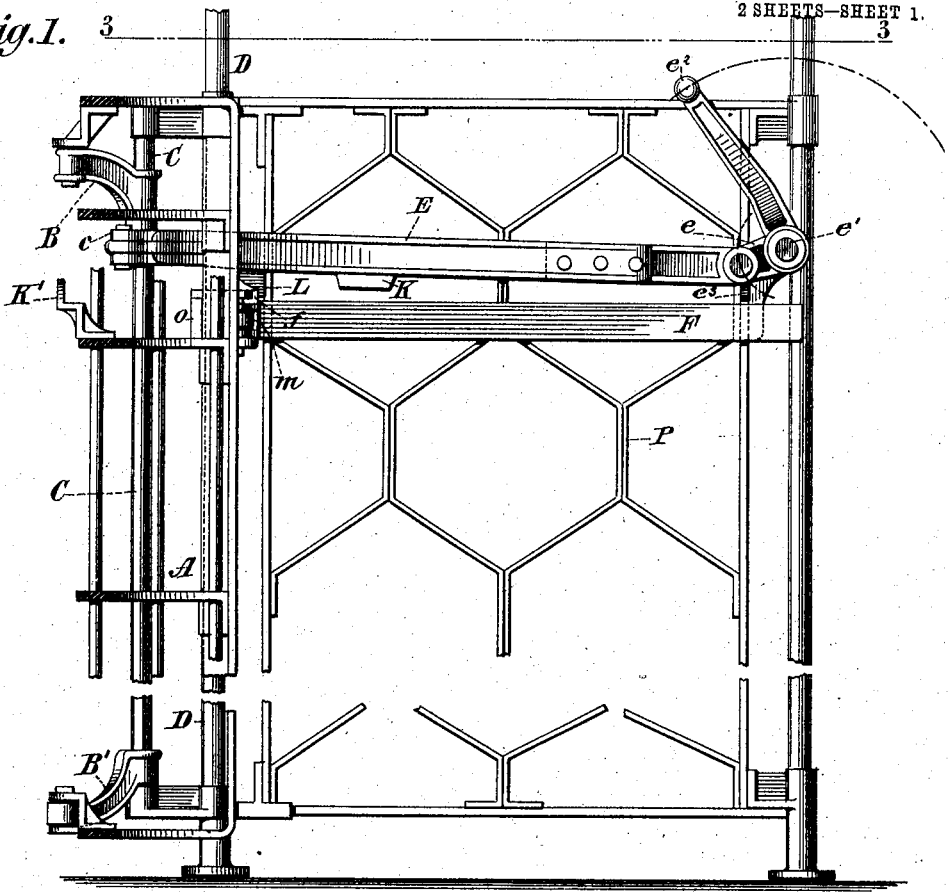
Figure 2:
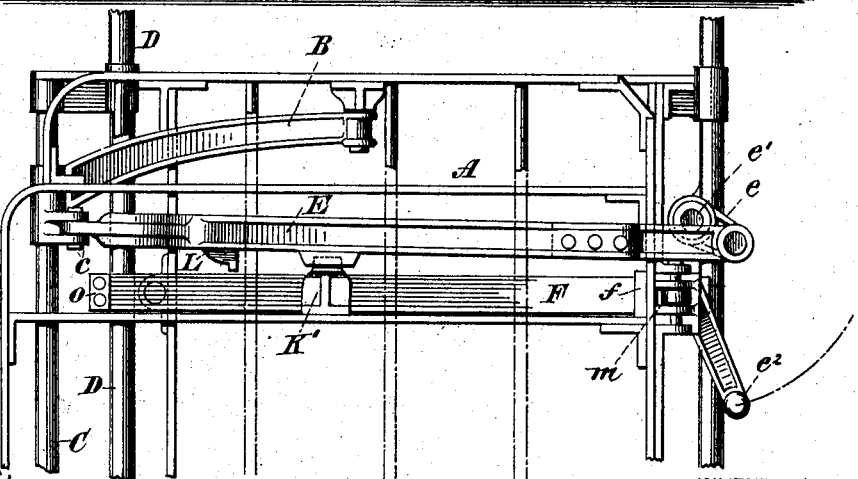

Figure 1 is a sectional view of a car-gate in its closed position, the view being taken on the line 1 1 of Fig. 3 looking in the direction of the arrow. Fig. 2 is a view of a similar car-gate in full open position and held by our locking device. Fig. 3 is a horizontal section taken on the line 3 3 of Fig. 1. Fig. 4 is an enlarged detail view of a locking device or catch, showing the same in a locked position when the gate is closed. Fig. 5 is an enlarged detail view of a catch, showing the parts in a locked position when the gate is open. Fig. 6 is an enlarged cross-section on the line 6 6 of Fig. 5.

We show our invention as applied to a gate arranged to close the entrance to an exit side of a car-platform—such, for example, as is in common use where a passage-way between successive cars of a train is provided for by means of an opening through the central portion of the dashboard of each car. We have furthermore shown our invention in connection with a gate of skeleton form extending throughout a portion only of the height of the space to be closed; but we wish it to be understood that the gate might be of other than skeleton form, and it might be extended upwardly and downwardly at pleasure to form a door, if so desired.

We have shown our invention as applied to gates pivotally supported on swinging arms and otherwise similar to the gates shown and described in patent to William R. Pitt, No. 655,891; but our invention is not confined to gates supported and operated as there shown, but may be applied to any swinging gates in which the opening mechanism is operated by an angle-lever and the motion is transmitted by a connecting-rod to other portions of the operating mechanism.

In the drawings, A is the gate. It is pivotally supported on the free ends of a pair of swinging arms B B', the latter extending laterally from and secured to a vertical spindle C, held in suitable bearings in proximity to a post or wall and in the present instance in proximity to the corner-post D of the car-platform in such a manner as to permit the spindle to rotate.

To the spindle C is fixed a crank-arm $c$, having its free end pivotally connected by an operating-rod E with the arm $e$ of a bell-crank lever or other angle-lever pivoted at $e'$ to a suitable fixed support on the dashboard P of the car and provided with an operating-handle $e^2$ for rocking it on its support.

K is a flange or shoulder depending from the connecting-rod E.

K' is a corresponding part of a flange rigidly attached to one of the transverse bars of the gate and projecting upwardly therefrom in such a position as and being adapted to engage with the flange K when the gate is in its full-open position and the connecting-rod is lowered so that the flanges K and K' overlap.

L is another flange or shoulder depending from the connecting-rod E and adapted to abut against and engage with a projection from the edge of the gate or, preferably, with the slide $f$, hereinafter described, when the gate is in its full-closed position and the connecting-rod is lowered by moving the angle-lever to its extreme upper position, as shown in Fig. 1.

The heel end of the gate is caused to traverse a predetermined path—in the present instance along or in close proximity to the dashboard—by means of a fixed track F, secured to the dashboard, and a slide $f$, pivoted or hinged to the heel end of the gate. This slide is similar to the one shown and performing a like function in the said Patent No. 655,891; but we add to the slide an antifriction-roller $m$, projecting through a slot $n$ in the slide $f$ and taking against the fixed track F and the heel edge of the gate and said roller being pivotally supported on either side of the slot $n$ in the slide $f$. When the gate is fully closed, the slide $f$ abuts against a stop $o$ on the end of the track F. The shoulder or flange L is so located and shaped as that when the connecting-rod E is lowered by moving the operating-handle $e^2$ to its extreme upper position, as shown in Fig. 1, the shoulder L drops behind and engages frictionally with the upper member of the slide $f$. The connection of the operating-rod E with the bell-crank lever is such that when the gate is in its closed position, Figs. 1 and 3, the arm $e$ of the bell-crank lever and the connecting-rod E will be a little past center with respect to the fulcrum $e'$ of the bell-crank lever. A stop $e^3$ is provided to arrest the movement of the angle-lever just after it carries the operating-rod E past the center with respect to the fulcrum of the lever. When the angle-lever has been moved, so that the arm $e$ takes against the stop $e^3$, the connecting-rod E will be lowered, so that the shoulder L takes against the slide $f$, as heretofore described, and the position of the connecting-rod E and arm $e$ with respect to the fulcrum $e'$, as just described, will prevent the connecting-rod E from being raised by accident, and consequently will prevent the shoulder L from being dislodged, so that the gate will be firmly locked in its closed position. When the operator desires to open the gate, the movement outward of the operating-handle $e^2$ will raise the connecting-arm, disengage the shoulder L from the slide $f$, and the gate will open in the usual manner. Similarly when the gate is in its full-open position, as shown in Figs. 2, 5, and 6, the movement of the angle-lever to its extreme low position will cause the flange K to overlap and engage frictionally with the corresponding flange K', projecting upward from one of the cross-bars of the gate. For similar reasons to those stated above this catch thus formed cannot be disengaged by any accidental means and will hold the gate firmly fixed in an open position, yet at the same time the upward movement of the operating-handle of the angle-lever will raise the connecting-rod, disengage the catch, and permit the gate to close.

We have shown K as made in one part with the connecting-rod; but this is not essential, as it might be a separate piece, riveted or otherwise attached to the connecting-rod, nor is the flange-like shape essential, since a shoulder or any projecting piece of such shape as to engage with a corresponding portion projecting from the gate would answer all the purposes of our invention. Similar remarks may be made as to the shoulder L, which might be attached in any suitable way to the connecting-rod E and be of any suitable shape or size capable of engaging with the slide $f$ or with a suitable shoulder projecting from the gate itself.

Having described our invention, what we claim, and desire to secure by Letters Patent, is—

1. The combination with a swinging gate suitably supported, an angle-lever, and a connecting-rod having one end pivoted to the arm of the angle-lever and its other end pivotally connected with suitable operating mechanism; of locking devices consisting of shoulders projecting from said connecting-rod and adapted alternately to engage frictionally with the framework of the gate when the angle-lever is revolved to its extreme positions on the opening or closing of the gate, substantially as described.

2. The combination with a gate, swinging arms forming a support for and having a pivotal connection with the gate, a spindle to which the swinging arms are secured, a crank-arm secured to said spindle, an angle-lever and a connecting-rod between the angle-lever and the crank-arm; of locking devices consisting of shoulders projecting from said connecting-rod and adapted alternately to engage frictionally with the framework of the gate when the angle-lever is moved alternately to its extreme positions in the opening or closing of the gate, substantially as described.

3. The combination with a gate, swinging arms forming a support for and having a pivotal connection with the gate, a spindle to which the swinging arms are secured, a crank-arm secured to said spindle, an angle-lever and a connecting-rod between the angle-lever and the crank-arm; of locking devices formed by flanges or shoulders depending from said connecting-rod, and corresponding parts upon the gate with which the flanges or shoulders are adapted to engage alternately, the engagement being frictional and the locking parts being engaged and disengaged as the gate is opened or closed by lowering the connecting-rod by the movement of the angle-lever alternately to its extreme positions, substantially as described.

4. The combination with a gate, swinging arms forming a support for and having pivotal connection with the gate, a spindle to which the swinging arms are secured, a crank-arm secured to said spindle, an angle-lever and a connecting-rod between the angle-lever and the crank-arm, a slide pivoted or hinged to one edge of the gate, and a fixed track on which the slide moves back and forth; of locking devices consisting of shoulders projecting from said connecting-rod and adapted to engage alternately with said slide and with a flange projecting from the gate as the gate is closed or opened, such engagement being frictional and the locking parts being engaged and disengaged through the lowering or raising of the connecting-rod by the angle-lever as the same is moved in the operation of opening and closing the gate, substantially as described.

WILLIAM R. PITT.
RAFFORD PITT.

Witnesses:
  E. T. SANFORD,
  H. M. COOMES.